United States Patent
Lim et al.

(10) Patent No.: US 11,184,152 B2
(45) Date of Patent: Nov. 23, 2021

(54) ELECTRONIC DEVICE FOR PERFORMING CODE-BASED ENCRYPTION SUPPORTING INTEGRITY VERIFICATION OF A MESSAGE AND OPERATING METHOD THEREOF

(71) Applicants: DONGGUK UNIVERSITY INDUSTRY-ACADEMIC COOPERATION FOUNDATION, Seoul (KR); Industry-Academic Cooperation Foundation, Chosun University, Gwangju (KR)

(72) Inventors: Dae Woon Lim, Seoul (KR); Young Sik Kim, Gwangju (KR); Ki Soon Yu, Seoul (KR)

(73) Assignees: DONGGUK UNIVERSITY INDUSTRY-ACADEMIC COOPERATION FOUNDATION, Seoul (KR); Industry-Academic Cooperation Foundation, Chosun University, Gwangju (KR)

( * ) Notice: Subject to any disclaimer, the term of this patent is extended or adjusted under 35 U.S.C. 154(b) by 276 days.

(21) Appl. No.: 16/673,971

(22) Filed: Nov. 5, 2019

(65) Prior Publication Data

US 2020/0153611 A1    May 14, 2020

(30) Foreign Application Priority Data

Nov. 13, 2018    (KR) ........................ 10-2018-0138649

(51) Int. Cl.
*H04L 9/32*    (2006.01)
*H04L 9/06*    (2006.01)
(Continued)

(52) U.S. Cl.
CPC .......... *H04L 9/0643* (2013.01); *H03M 13/09* (2013.01); *H03M 13/1105* (2013.01);
(Continued)

(58) Field of Classification Search
CPC ..... H04L 9/0618; H04L 9/0643; H04L 9/006; H04L 9/0869; H04L 9/14; H04L 9/32;
(Continued)

(56) References Cited

U.S. PATENT DOCUMENTS 5,483,598 A    1/1996    Kaufman et al.
9,203,608 B2    12/2015    Myung et al.
(Continued)

FOREIGN PATENT DOCUMENTS

JP    5038866 B2    10/2012
JP    5512559 B2    6/2014
(Continued)

OTHER PUBLICATIONS

Extraction and Verification of Mobile Message Integrity by Rakesh Verma, Deepak Singh Tomar and Shashi Kant Rathore pp. 5; IEEE (Year: 2011).*
(Continued)

*Primary Examiner* — Samson B Lemma
*Assistant Examiner* — Ali H. Cheema
(74) *Attorney, Agent, or Firm* — Park, Kim & Suh, LLC (57) ABSTRACT

Disclosed is an electronic device for performing code-based encryption supporting integrity verification of a message and an operating method thereof. When a data transmission side encrypts a message through code-based encryption and transmits the encrypted message to a data reception apparatus, the data transmission side is allowed to use a hash value generated based on a part of the message as an error in code-based encryption to support the data reception apparatus to verify an integrity of a received message by using the hash value.

9 Claims, 2 Drawing Sheets

(51) Int. Cl.
*H04L 9/00* (2006.01)
*H04L 9/08* (2006.01)
*H03M 13/11* (2006.01)
*H03M 13/09* (2006.01)
*H04L 9/14* (2006.01)

(52) U.S. Cl.
CPC ......... *H03M 13/1174* (2013.01); *H04L 9/006* (2013.01); *H04L 9/0869* (2013.01); *H04L 9/14* (2013.01); *H04L 9/3242* (2013.01)

(58) Field of Classification Search
CPC ... H04L 9/3242; H04L 9/3247; H04L 9/0825; H04L 2209/12; H04L 2209/08; H04L 2209/72; H03M 13/09; H03M 13/1105; H03M 13/1174
USPC .............................. 380/28, 30, 46; 713/181
See application file for complete search history.

(56) References Cited

U.S. PATENT DOCUMENTS

| | | | | |
|---|---|---|---|---|
| 10,061,636 | B1* | 8/2018 | Eaton | G06F 21/72 |
| 10,404,458 | B1* | 9/2019 | Yamada | H04L 9/0852 |
| 2004/0120519 | A1* | 6/2004 | Joye | H04L 9/30 |
| | | | | 380/30 |
| 2011/0296193 | A1* | 12/2011 | Alghathbar | H04L 9/0643 |
| | | | | 713/181 |
| 2013/0094649 | A1* | 4/2013 | Tomlinson | H04L 9/3026 |
| | | | | 380/30 |
| 2015/0163060 | A1* | 6/2015 | Tomlinson | G09C 1/00 |
| | | | | 380/30 |
| 2016/0080146 | A1* | 3/2016 | Gauravaram | H04L 9/0869 |
| | | | | 380/46 |
| 2018/0069706 | A1* | 3/2018 | Dubrova | H04L 9/3236 |
| 2018/0145832 | A1 | 5/2018 | No et al. | |
| 2019/0103964 | A1* | 4/2019 | Khandani | H04L 9/0858 |

FOREIGN PATENT DOCUMENTS

| | | |
|---|---|---|
| KR | 10-2013-0020980 A | 3/2013 |
| KR | 10-2018-0058366 A | 6/2018 |
| KR | 10-2018-0104363 A | 9/2018 |
| KR | 10-1894566 B1 | 9/2018 |

OTHER PUBLICATIONS

A Secure Erasure Code-Based Cloud Storage System with Secure Data Forwarding by Hsiao-Ying Lin and Wen-Guey Tzeng pp. 9; IEEE vol. 23, No. 6, Jun. 2012.*

An Effective Integrity Check Scheme for Secure Erasure Code-Based Storage Systems by Shiuan-Tzuo Shen, Hsiao-Ying Lin, and Wen-Guey Tzeng pp. 12; IEEE vol. 64, No. 3, Sep. 2015.*

Kazukuni Kobara et al., Fellow, IEEE, "On the One-Wayness Against Chosen-Plaintext Attacks of the Loidreau's Modified McEliece PKC", IEEE Transactions on Information Theory, vol. 49, No. 12, Dec. 2003, pp. 3160-3168, 9pages.

Reza Hooshmand et al., "Secret Key Cryptosystem based on Non-Systematic Polar Codes", Wireless Personal Communications, Sep. 2015, vol. 84, Issue 2, pp. 1345-1373, Springer US, 12pages.

* cited by examiner

FIG. 1

ELECTRONIC DEVICE FOR PERFORMING CODE-BASED ENCRYPTION SUPPORTING INTEGRITY VERIFICATION OF A MESSAGE AND OPERATING METHOD THEREOF

CROSS-REFERENCE TO RELATED APPLICATIONS

This application claims priority to and the benefit of Korean Patent Application No. 10-2018-0138649 filed in the Korean Intellectual Property Office on Nov. 13, 2018, the entire contents of which are incorporated herein by reference.

TECHNICAL FIELD

The present invention relates to a technology for supporting integrity verification of a message to be performed in a code-based encryption technique.

BACKGROUND ART

In recent years, as various types of information is generated and circulated, damage such as exposure of important information to a third party is caused due to hacking or transmission of information to an incorrect path.

In particular, when in the state where no defense mechanism is applied to the important information such as military information or personal information during a process of transferring information, the important information is accidentally transmitted to the third party, the third party can easily access the important information, thereby causing great damage.

In recent years, in order to prevent exposure of such important information, there has been introduced a technique of encrypting the important information by using a predetermined encryption key and transmitting the encrypted information to the other party.

As a general data encryption scheme, a scheme is used, in which when a data transmission side and a data reception side share the same secret key and the data transmission side encrypts the data with the secret key and transmits the encrypted data, the data reception side decrypts the data with the same secret key.

However, such a symmetric key based encryption scheme has a weak point of being vulnerable to security in that there is a risk that the corresponding secret key is exposed in the process of transferring and sharing the secret key.

In order to solve the drawbacks of the symmetric key based encryption scheme, a data encryption method using asymmetric keys, which are called a public key and a private key, has been introduced. In the asymmetric key based data encryption scheme, a scheme is used, in which when the data transmission side encrypts data with the public key and transmits the encrypted data to the data reception side, the data reception side decrypts the data with the private key corresponding to the public key, or when the data transmission side encrypts the data with the private key and transmits the encrypted data to the data reception side, the data reception side decrypts the data with the public key.

As such, various encryption schemes appear, but when a plain text is continuously encrypted by using the same encryption key, since a replay attack through analysis of a generation pattern of an encryption text is possible, as a technique for preventing this, introduction of a technique that disables pattern analysis of the encryption text by encrypting plain text data to be encrypted by adding a random number is also considered.

In recent years, a code-based encryption scheme has been introduced in order to cope with an attack based on a high-performance computer system during an encryption process.

The code-based encryption scheme is a scheme in which when a data transmission apparatus generates a public key $K_{pub}$ by using a k×n (k and n is a natural number) sized generator matrix G having code values "1" and "0" as components with an error correction capability for t (t is the natural number) bit code, a k×k sized binary non-singular matrix S having code values "1" and "0" as components and an n×n sized permutation matrix P having code values "1" and "0" as components, encrypts a message m to be transmitted to a data reception apparatus with the public key $K_{pub}$ and generates an encryption message c and thereafter, transmits the encryption message c to the data reception apparatus, the data reception apparatus decrypts the encryption message by using the generator matrix G, the binary non-singular matrix S, and the permutation matrix P prestored in a memory as the private key to restore the message m.

In this regard, a brief description of the data encryption and decryption schemes in the code-based encryption scheme is as follows.

First, $K_{pub}$ which is the public key used by a data transmission apparatus is defined by Equation 1 below.

$$K_{pub} = SGP \qquad \text{[Equation 1]}$$

Here, in Equation 1, the generator matrix G represents the k×n sized generator matrix having the error correction capability for the t-bit code, S represents a randomly determined k×k sized binary non-singular matrix, and P represents a randomly determined n×n sized permutation matrix.

In this case, a data reception apparatus stores each of the generator matrix G, the binary non-singular matrix S, and the permutation matrix P with the private key corresponding to the public key $K_{pub}$ in the memory.

Under such a situation, the data transmission apparatus may generate an encryption message c by performing an encryption operation depending on Equation 2 below with respect to the message m having a size of k bits to be transmitted to the data reception apparatus.

$$c = m K_{pub} \oplus e \qquad \text{[Equation 2]}$$

Here, e represents a random vector having a Hamming weight of t or less and having a length of n bits and "$\oplus$" represents an exclusive OR operation.

The Hamming weight means the number of bit values of "1" in a bit string constituting data.

As such, when the encryption message c is generated, the data transmission apparatus completes the data encryption transmission by transmitting the encryption message c to the data reception apparatus.

As such, when the encryption message c is transmitted from the data transmission apparatus to the data reception apparatus, the data reception apparatus uses the generator matrix G, the binary non-singular matrix S, and the permutation matrix P stored in the memory to decrypt the encryption message.

In this regard, when the encryption message c is received, the data reception apparatus calculates $cP^{-1}$ by multiplying the encrypted message c by $P^{-1}$, which is an inverse matrix of the permutation matrix P, as illustrated in Equation 3 below.

$$cP^{-1} = m SG \oplus eP^{-1} \qquad \text{[Equation 3]}$$

Then, the data reception apparatus may calculate mS by performing data decoding for error correction using the generator matrix G from the $cP^{-1}$.

Here, since the e represents the vector having the Hamming weight of t or less and P represents the permutation matrix, $eP^{-1}$ also has the Hamming weight of t or less, consequently, it can be seen that $cP^{-1}$ represents that the error occurs with respect to t bit values or less in a codeword mSG. Therefore, the data reception apparatus performs the error correction on $cP^{-1}$ using G, which is the generator matrix having the error correction capability for the t-bit code stored in the memory to decode mS.

As such, when the calculation of the mS is completed, the data reception apparatus multiplies mS by $S^{-1}$ which is the inverse matrix of the binary non-singular matrix S stored in the memory as illustrated in Equation 4 below to finally decode the original message m.

$$mSS^{-1}=m \qquad \text{[Equation 4]}$$

The code-based encryption scheme is configured to perform encryption for data by using asymmetric keys such as a public key and a secret key, but since a function to verify the integrity of a message itself transmitted from a data transmission side is not introduced in the code-based encryption scheme, when the message is forged or falsified during a data transmission process or the message is not unintentionally changed due to a mistake of the data transmission side and transmitted to a data reception side, a problem that the data reception side receives a wrong message may occur.

Accordingly, a research into a technology for supporting the integrity of the message to be guaranteed in the code-based encryption scheme is required.

SUMMARY OF THE INVENTION

The present invention has been made in an effort to allow, when a data transmission side encrypts a message through code-based encryption and transmits the encrypted message to a data reception apparatus, the data transmission side to use a hash value generated based on a part of the message as an error in code-based encryption to support the data reception apparatus to verify an integrity of a received message by using the hash value.

An exemplary embodiment of the present invention provides an electronic device for performing code-based encryption supporting integrity verification of a message, the electronic device including: a public key storing unit storing a public key $K_{pub}$ ($K_{pub}$=SGP) in which a binary non-singular matrix S having a size of k×k (k is a natural number) including code values of "1" and "0" as components, and a generator matrix G having a size of k×n (n is the natural number) including code values of "1" and "0" as components with an error correction capability for t (t is the natural number) bit code, and a permutation matrix P including a size of n×n including the code values "1" and "0" as the components are multiplied by each other; a data generating unit splitting an original message m having a size of k bits to be transmitted to a data reception apparatus into a first partial message $m_1$ having a size of k–t (t is a natural number smaller than k) bits and a second partial message $m_2$ having a size of t bits and generating a random bit string r having a size of t bits; a hash value generating unit generating first concatenation data m||r acquired by concatenating the original message m and the random bit string r and generating a hash value h by applying the first concatenation data m||r to a predetermined hash function as an input; an error generating unit generating second concatenation data $m_2$||h acquired by concatenating the second partial message $m_2$ and the hash value h and generating an error bit string e having a hamming weight of t and a size of n bits by applying the second concatenation data $m_2$||h to a predetermined bit string generation function as an input, in which when the input value is applied to the bit string generation function, the bit string generation function is a function outputting a bit string having a hamming weight of t and a size of n bits as an output value; a message encryption unit generating third concatenation data $m_1$||r acquired by concatenating the first partial message $m_1$ and the random bit string r and generating an encryption message c by performing error correction based encryption based on the public key $K_{pub}$ and the error bit string e with respect to the third concatenation data $m_1$||r; and a message encryption and transmission unit transmitting the encryption message c to the data reception apparatus.

Another exemplary embodiment of the present invention provides an operating method of an electronic device for performing code-based encryption supporting integrity verification of a message, the operating method including: maintaining a public key storing unit storing a public key $K_{pub}$ ($K_{pub}$=SGP) in which a binary non-singular matrix S having a size of k×k (k is a natural number) including code values of "1" and "0" as components, and a generator matrix G having a size of k×n (n is the natural number) including code values of "1" and "0" as components with an error correction capability for t (t is the natural number) bit code, and a permutation matrix P including a size of n×n including the code values "1" and "0" as the components are multiplied by each other; splitting an original message m having a size of k bits to be transmitted to a data reception apparatus into a first partial message $m_1$ having a size of k–t (t is a natural number smaller than k) bits and a second partial message $m_2$ having a size of t bits and generating a random bit string r having a size of t bits; generating first concatenation data m||r acquired by concatenating the original message m and the random bit string r and generating a hash value h by applying the first concatenation data m||r to a predetermined hash function as an input; generating second concatenation data $m_2$||h acquired by concatenating the second partial message $m_2$ and the hash value h and generating an error bit string e having a hamming weight of t and a size of n bits by applying the second concatenation data $m_2$||h to a predetermined bit string generation function as an input, in which when the input value is applied to the bit string generation function, the bit string generation function is a function outputting a bit string having a hamming weight of t and a size of n bits as an output value; generating third concatenation data $m_1$||r acquired by concatenating the first partial message $m_1$ and the random bit string r and generating an encryption message c by performing error correction based encryption based on the public key $K_{pub}$ and the error bit string e with respect to the third concatenation data $m_1$||r; and transmitting the encryption message c to the data reception apparatus.

According to an exemplary embodiment of the present invention, when a data transmission side encrypts a message through code-based encryption and transmits the encrypted message to the data reception apparatus, the data transmission side is allowed to use a hash value generated based on a part of the message as an error in code-based encryption to support the data reception apparatus to verify an integrity of a received message by using the hash value.

DETAILED DESCRIPTION

Hereinafter, exemplary embodiments of the present invention will be described in detail with reference to the accompanying drawings. The description does not limit the present invention to specific exemplary embodiments, and it should be understood that the present invention covers all the modifications, equivalents and replacements included within the idea and technical scope of the present invention. In describing each drawing, like reference numerals refer to like elements and if it is not contrarily defined, all terms used herein including technological or scientific terms have the same meanings as those generally understood by a person with ordinary skill in the art.

In this document, unless explicitly described to the contrary, the word "comprise" and variations such as "comprises" or "comprising", will be understood to imply the inclusion of stated elements but not the exclusion of any other elements. Further, in various exemplary embodiments of the present invention, each of components, functional blocks or means may be constituted by one or more lower components and electrical, electronic, and mechanical functions performed by respective components may be implemented as various known devices or mechanical elements including an electronic circuit, an integrated circuit, an Application Specific Integrated Circuit (ASIC), etc., and the respective components may be separately implemented or two or more components may be integrated into one and implemented.

Meanwhile, blocks of the accompanying block diagram or steps of a flowchart may be appreciated as meaning compute program instructions mounted on a processor or a memory of data processsible equipment such as a universal computer, a special computer, a portable notebook computer, a network computer, etc., and performing designated functions. Since the computer program instructions may be stored in a memory provided in a computer device or a computer readable memory, functions in blocks of a block diagram or steps of a flowchart may be produced as a manufactured object including an instruction mean performing the functions. Moreover, each block or each step may represent a part of a module, a segment, or a code that includes one or more executable instructions for executing a specified logical function(s). It should also be noted that in some replaceable embodiments, the functions mentioned in the blocks or steps may also be executed differently from a predetermined order. For example, two blocks or steps that are subsequently illustrated are substantially simultaneously carried out, or may be performed in a reverse order, and in some cases, the functions may be performed while some blocks or steps are omitted.

Figure 1:
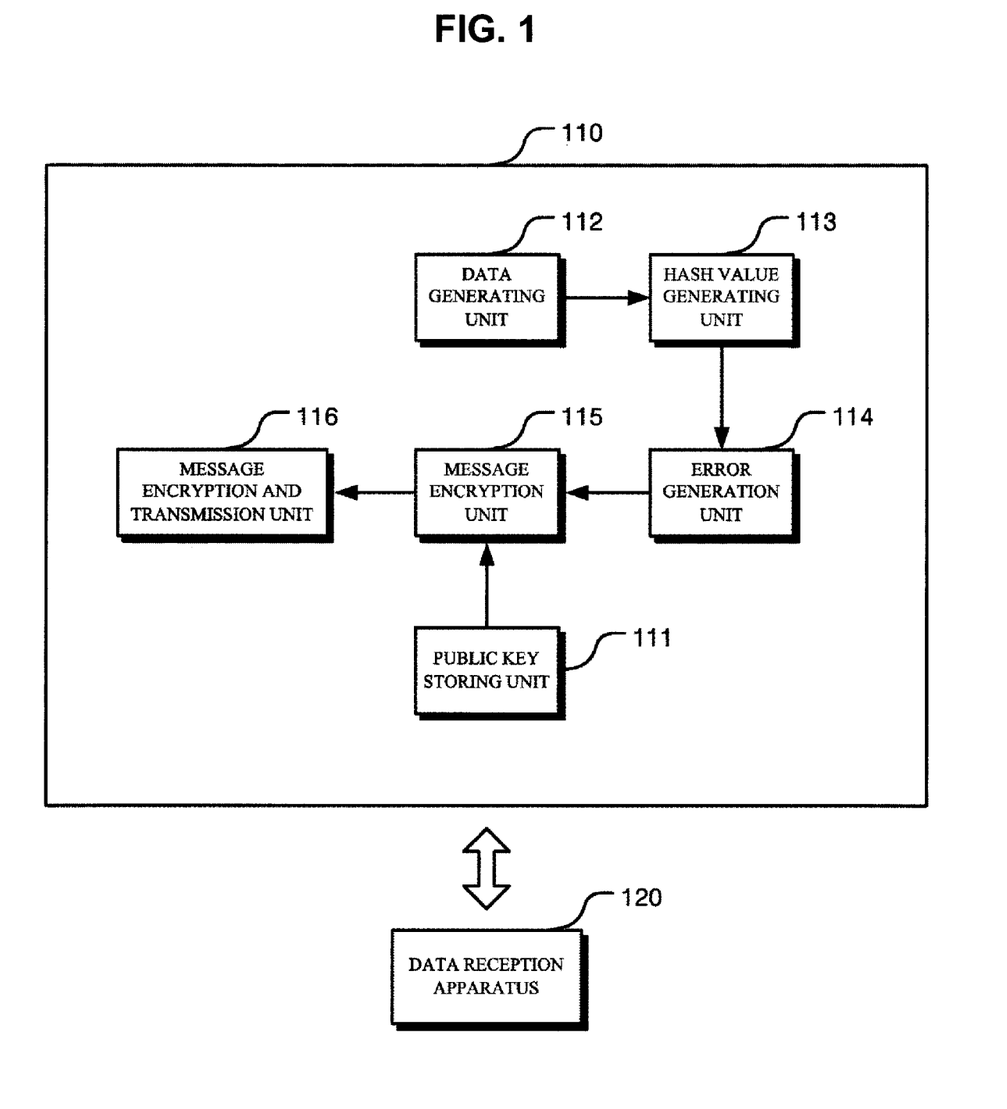
FIG. 1 is a diagram illustrating a structure of an electronic device for performing code-based encryption supporting integrity verification of a message according to an exemplary embodiment of the present invention.

FIG. 1 is a diagram illustrating a structure of an electronic device for performing code-based encryption supporting integrity verification of a message according to an exemplary embodiment of the present invention.

Referring to FIG. 1, an electronic device 110 for performing code-based encryption supporting integrity verification of a message according to the present invention includes a public key storing unit 111, a data generating unit 112, a hash value generating unit 113, an error generating unit 114, a message encryption unit 115, and a message encryption transmitting unit 116.

The public key storing unit 111 stores a public key $K_{pub}$ ($K_{pub}$=SGP) in which a binary non-singular matrix S having a size of k×k (k is a natural number) including code values of "1" and "0" as components, and a generator matrix G having a size of k×n (n is the natural number) including code values of "1" and "0" as components with an error correction capability for t (t is the natural number) bit code, and a permutation matrix P including a size of n×n including the code values "1" and "0" as the components are multiplied by each other.

In this regard, the public key storing unit 111 stores the public key $K_{pub}$ according to Equation 5 below.

$$K_{pub}=SGP \qquad \text{[Equation 5]}$$

The data generating unit 112 splits an original message m having a size of k bits to be transmitted to a data reception apparatus 120 into a first partial message $m_1$ having a size of k−t (t is a natural number smaller than k) bits and a second partial message $m_2$ having a size of t bits and generates a random bit string r having a size of t bits.

The hash value generating unit 113 generates first concatenation data m∥r acquired by concatenating the original message m and the random bit string r and generates a hash value h by applying the first concatenation data m∥r to a predetermined hash function as an input.

In this regard, when the hash function is set as H( ), the hash value h may be expressed as shown in Equation 6 below.

$$h = H(m\|r) \qquad \text{[Equation 6]}$$

The error generating unit 114 generates second concatenation data $m_2\|h$ acquired by concatenating the second partial message $m_2$ and the hash value h and the second concatenation data $m_2\|h$ is applied to a predetermined bit string generation function (when the input value is applied to the bit string generation function, the bit string generation function is a function outputting a bit string having a hamming weight of t and a size of n bits as an output value) as the input to generate an error bit string e having a hamming weight of t and a size of n bits.

In this regard, when the bit string generation function is set as B( ), the error bit string e may be expressed as shown in Equation 7 below.

$$e = B(m_2\|h) \qquad \text{[Equation 7]}$$

The message encryption unit 115 generates third concatenation data $m_1\|r$ acquired by concatenating the first partial message $m_1$ and the random bit string r and error correction based encryption is performed based on the public key $K_{pub}$ and the error bit string e with respect to the third concatenation data $m_1\|r$ to generate the encryption message c.

In this case, according to an exemplary embodiment of the present invention, the message encryption unit 115 generates a result value c' acquired by multiplying the third concatenation data $m_1\|r$ by the public key $K_{pub}$ and performs an exclusive OR operation with respect to the result value c' and the error bit string e to generate the encryption message c.

In this regard, the message encryption unit 115 may generate the encryption message c by performing an operation shown in Equation 8 below.

$$c = (m_1\|r)K_{pub} \oplus e \qquad \text{[Equation 8]}$$

Here, "$\oplus$" means the exclusive OR operation.

As such, when the generation of the encryption message c is completed, the message encryption and transmission unit 116 transmits the encryption message c to the data reception apparatus 120.

In this case, according to an exemplary embodiment of the present invention, the data reception apparatus 120 may store the binary non-singular matrix S, the generator matrix G, and the permutation matrix P on the memory as a private key corresponding to the public key $K_{pub}$ and store the hash function and the bit string generation function on the memory.

In this case, when the data reception apparatus 120 receives the encryption message c from the electronic device 110, the data reception apparatus 120 performs error correction based decoding based on the binary non-singular matrix S, the generator matrix G, and the permutation matrix P stored on the memory as the private key to restore the third concatenation data $m_1 \| r$ from the encryption message c.

In this case, according to an exemplary embodiment of the present invention, when the data reception apparatus 120 receives the encryption message c from the electronic device 110, the data reception apparatus 120 computes $cP^{-1}$ by multiplying the encryption message c by an inverse matrix $P^{-1}$ of the permutation matrix P stored on the memory according to the operation of Equation 9 below and performs the error correction decoding with respect to the $cP^{-1}$ based on the generator matrix G and computes $(m_1 \| r)S$ obtained by multiplying the third concatenation data $m_1 \| r$ and the binary non-singular matrix S and then multiplies the $(m_1 \| r)S$ by an inverse matrix $S^{-1}$ of the binary non-singular matrix S according to the operation of Equation 10 below to restore the third concatenation data $m_1 \| r$.

$$cP^{-1} = (m_1 \| r)SG \oplus eP^{-1} \qquad \text{[Equation 9]}$$

$$(m_1 \| r)SS^{-1} = (m_1 \| r) \qquad \text{[Equation 10]}$$

The $cP^{-1}$ computed according to the operation of Equation 9 may be regarded as data in which the error occurs with respect to t bit values in a codeword called $(m_1 \| r)SG$. The reason is that since e is the error bit string having the hamming weight of t and P is the permutation matrix, $eP^{-1}$ also has the hamming weight of t. Therefore, the data reception apparatus 120 performs decoding for error correction with respect to $cP^{-1}$ by using the generator matrix G having the error correction capability for t-bit codes stored in the memory to compute $(m_1 \| r)S$.

In this case, according to an exemplary embodiment of the present invention, the data reception apparatus 120 may use syndrome decoding by a decoding scheme for error correction and specifically, the data reception apparatus 120 generates a parity check matrix corresponding to the generator matrix G and computes a syndrome from $cP^{-1}$ based on the parity check matrix and then performs the syndrome decoding based on the computed syndrome to compute $(m_1 \| r)S$.

As such, when the third concatenation data $m_1 \| r$ is restored, the data reception apparatus 120 may restore the error bit string e based on the third concatenation data $m_1 \| r$ and the encryption message c.

In this regard, the data reception apparatus 120 sequentially multiplies the third concatenation data $m_1 \| r$ by the binary non-singular matrix S, the generator matrix G, and the permutation matrix P and then performs the exclusive OR operation of the result value and the encryption message c according to the operation of Equation 11 below to restore the error bit string e.

$$\begin{aligned}
e &= (m_1 \| r)SGP \oplus c \qquad \text{[Equation 11]} \\
&= (m_1 \| r)SGP \oplus (m_1 \| r)SGP \oplus e \\
&= e
\end{aligned}$$

Here, since the encryption message c is data acquired through an exclusive OR operation between the error bit string e and a value acquired by sequentially multiplying the third concatenation data $m_1 \| r$ by the binary non-singular matrix S, the generator matrix G, and the permutation matrix P, when the exclusive OR operation between the result value acquired by sequentially multiplying the third concatenation data $m_1 \| r$ by the binary non-singular matrix S, the generator matrix G, and the permutation matrix p and encryption message c is performed again as shown in Equation 11 above, the error bit string e may be restored.

As such, when the error bit string e is restored, the data reception apparatus 120 performs an inverse operation for deriving an input value having the error bit string e as an output value based on the bit string generation function stored on the memory to compute the second concatenation data $m_2 \| h$ and then extract the second partial message $m_2$ and the hash value h concatenated to the second concatenation data $m_2 \| h$.

In this regard, since the error bit string e is an output value generated by applying the second concatenation data $m_2 \| h$ to the bit string generation function as the input according to the operation of Equation 7 by the error generation unit 114, the data reception apparatus 120 performs the inverse operation for the bit string generation function to restore the second concatenation data $m_2 \| h$ from the error bit string e when the error bit string e is restored and the data reception apparatus 120 may extract the second partial message $m_2$ and the hash value h concatenated to the second concatenation data $m_2 \| h$ when the second concatenation data $m_2 \| h$ is restored.

As such, when the second partial message $m_2$ and the hash value h are extracted, the data reception apparatus 120 extracts the first partial message $m_1$ and the random bit string r concatenated to the third concatenation data $m_1 \| r$ and then generates the first concatenation data $m \| r$ by concatenating the first partial message $m_1$, the second partial message $m_2$, and the random bit string r and applies the first concatenation data $m \| r$ to the hash function stored on the memory as the input to generate a verification hash value h'.

Here, since data in which the first partial message $m_1$ and the second partial message $m_2$ are concatenated is the original message m, data in which the first partial message $m_1$, the second partial message $m_2$, and the random bit string r are concatenated become the first concatenation data $m \| r$.

In this case, the verification hash value h' may be expressed as shown in Equation 12 below.

$$h' = H(m \| r) \qquad \text{[Equation 12]}$$

As such, when the computation of the verification hash value h' is completed, the data reception apparatus 120 may determine whether the verification hash value h' and the hash value h extracted from the second concatenation data $m_2 \| h$ are equal to each other.

When it is determined that the verification hash value h' is equal to the extracted hash value h, it is meant that the encryption message c is not modified during a process of transmitting the encryption message c from the electronic device 110 to the data reception apparatus 120, and as a result, the data reception apparatus 120 may determine that the integrity is verified with respect to the encryption message c.

In this case, according to an exemplary embodiment of the present invention, when the data reception apparatus 120 determines that the integrity is verified with respect to the encryption message c, since it may be regarded that there is no attack of a third party between the electronic device 110 and the data reception apparatus 120, the original message m may be restored by concatenating the first partial message $m_1$ and the second partial message $m_2$.

Consequently, the electronic device 110 for performing code-based encryption supporting integrity verification of a message according to the present invention encrypts the message through the code-based encryption and transmits the encrypted message to the data reception apparatus 120 and uses a hash value generated based on a part of the message as an error in the code-based encryption, and as a result, the data reception apparatus 120 may support the integrity of the message transmitted from the electronic device 110 to be verified based on the hash value.

Figure 2:
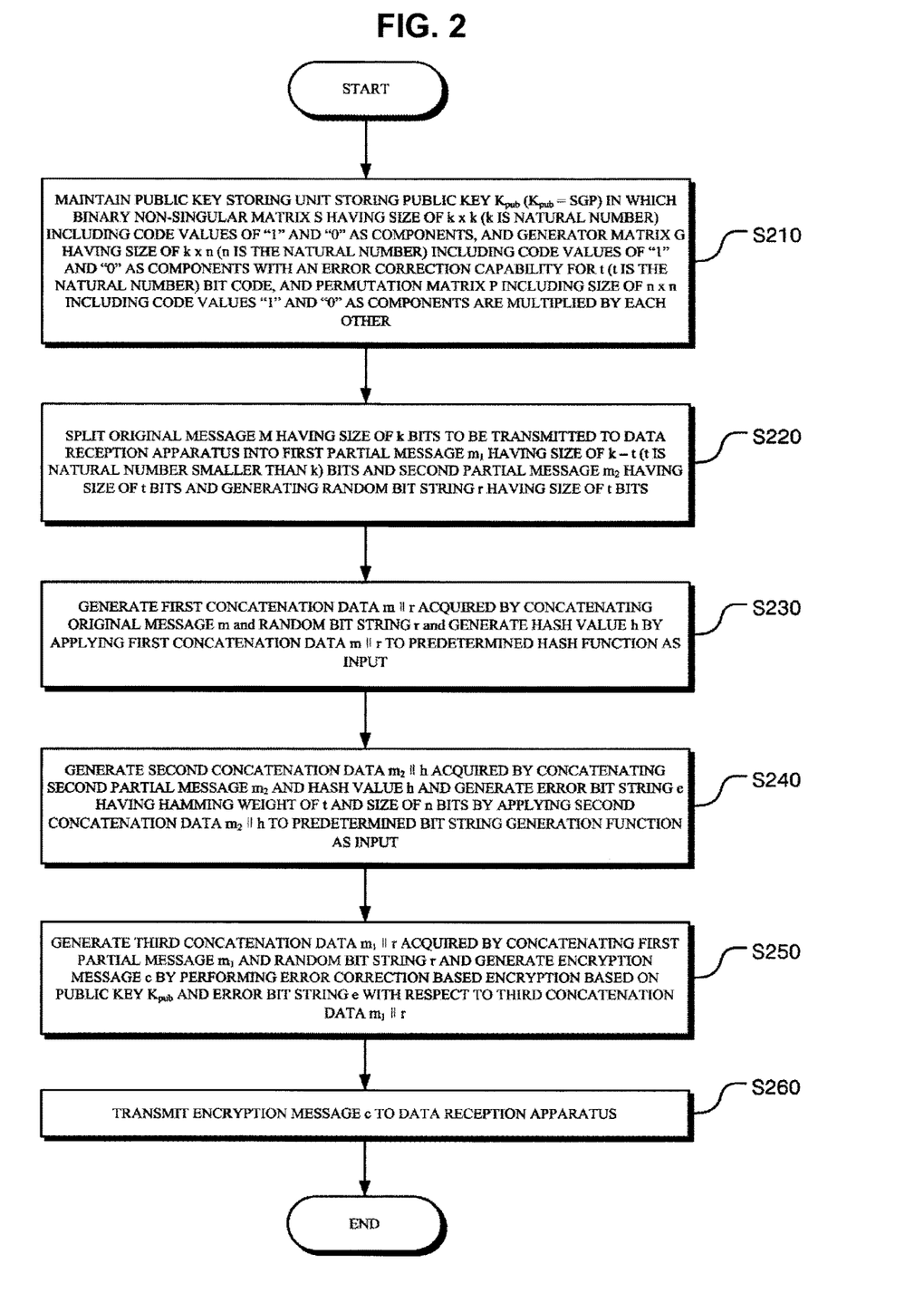
FIG. 2 is a flowchart showing an operating method of an electronic device for performing code-based encryption supporting integrity verification of a message according to an exemplary embodiment of the present invention.

FIG. 2 is a flowchart showing an operating method of an electronic device for performing code-based encryption supporting integrity verification of a message according to an exemplary embodiment of the present invention.

In step S210, the public key storing unit is maintained, which stores a public key $K_{pub}$($K_{pub}$=SGP) in which a binary non-singular matrix S having a size of k×k (k is a natural number) including code values of "1" and "0" as components, and a generator matrix G having a size of k×n (n is the natural number) including code values of "1" and "0" as components with an error correction capability fort (t is the natural number) bit code, and a permutation matrix P including a size of n×n including the code values "1" and "0" as the components are multiplied by each other.

In step S220, an original message m having a size of k bits to be transmitted to a data reception apparatus 120 is split into a first partial message $m_1$ having a size of k−t (t is a natural number smaller than k) bits and a second partial message $m_2$ having a size of t bits and a random bit string r having a size of t bits is generated.

In step S230, first concatenation data m∥r acquired by concatenating the original message m and the random bit string r is generated and a hash value h is generated by applying the first concatenation data m∥r to a predetermined hash function as an input.

In step S240, second concatenation data $m_2$∥h acquired by concatenating the second partial message $m_2$ and the hash value h is generated and the second concatenation data $m_2$∥h is applied to a predetermined bit string generation function (when the input value is applied to the bit string generation function, the bit string generation function is a function outputting a bit string having a hamming weight of t and a size of n bits as an output value) as the input to generate an error bit string e having a hamming weight of t and a size of n bits.

In step S250, third concatenation data $m_1$∥r acquired by concatenating the first partial message $m_1$ and the random bit string r is generated and error correction based encryption is performed based on the public key $K_{pub}$ and the error bit string e with respect to the third concatenation data $m_1$∥r to generate the encryption message c.

In step S260, the encryption message c is transmitted to the data reception apparatus.

In this case, according to an exemplary embodiment of the present invention, in step S250, a result value c' is generated by multiplying the third concatenation data $m_1$∥r by the public key $K_{pub}$ and an exclusive OR operation is performed with respect to the result value c' and the error bit string e to generate the encryption message c.

In this case, according to an exemplary embodiment of the present invention, the data reception apparatus stores the binary non-singular matrix S, the generator matrix G, and the permutation matrix P on the memory as a private key corresponding to the public key $K_{pub}$ and stores the hash function and the bit string generation function on the memory and when the encryption message c is received, the data reception apparatus performs error correction based decoding based on the binary non-singular matrix S, the generator matrix G, and the permutation matrix P stored on the memory as the private key to restore the third concatenation data $m_1$∥r from the encryption message c.

In this case, according to an exemplary embodiment of the present invention, when the data reception apparatus receives the encryption message c, the data reception apparatus computes $cP^{-1}$ by multiplying the encryption message c by an inverse matrix $P^{-1}$ of the permutation matrix P stored on the memory and performs the error correction for decoding with respect to the $cP^{-1}$ based on the generator matrix G to compute ($m_1$∥r)S obtained by multiplying the third concatenation data $m_1$∥r and the binary non-singular matrix S and then multiplies the ($m_1$∥r)S by an inverse matrix $S^{-1}$ of the binary non-singular matrix S to restore the third concatenation data $m_1$∥r.

As such, when the third concatenation data $m_1$∥r is restored, the data reception apparatus restores the error bit string e based on the third concatenation data $m_1$∥r and the encryption message c and performs an inverse operation for deriving an input value having the error bit string e as an output value based on the bit string generation function stored on the memory to compute the second concatenation data $m_2$∥h and then extract the second partial message $m_2$ and the hash value h concatenated to the second concatenation data $m_2$∥h.

When the second partial message $m_2$ and the hash value h are extracted, the data reception apparatus extracts the first partial message $m_1$ and the random bit string r concatenated to the third concatenation data $m_1$∥r and then generates the first concatenation data m∥r by concatenating the first partial message $m_1$, the second partial message $m_2$, and the random bit string r and applies the first concatenation data m∥r to the hash function stored on the memory as the input to generate a verification hash value h' and then determine that the integrity is verified with respect to the encryption message c when it is determined that the verification hash value h' is equal to the extracted hash value h.

In this case, according to an exemplary embodiment of the present invention, when it is determined that the integrity is verified with respect to the encryption message c, the data reception apparatus may restore the original message m by concatenating the first partial message $m_1$ and the second partial message $m_2$.

Hereinabove, the operating method of an electronic device for performing code-based encryption supporting integrity verification of a message according to an exemplary embodiment of the present invention has been described with reference to FIG. 2. Here, since the operating method of the electronic device for performing code-based encryption supporting integrity verification of a message according to an exemplary embodiment of the present invention may correspond to a configuration for an operation of the electronic device 110 for performing code-based encryption supporting integrity verification of a message described with reference to FIG. 1, a more detailed description thereof will be omitted.

The operating method of the electronic device for performing code-based encryption supporting integrity verification of a message according to an exemplary embodiment of the present invention may be implemented by a computer program stored in a storage medium for executing the computer program through coupling with a computer.

The operating method of the electronic device for performing code-based encryption supporting integrity verification of a message according to an exemplary embodiment of the present invention may be implemented in a program command type which may be performed through various computer means and recorded in a computer readable medium. The computer readable medium may include singly or combinationally a program command, a data file, or a data structure or a combination thereof. The program command recorded in the medium may be program instructions specially designed and configured for the present invention, or may be program instructions publicly known to and used by those skilled in the computer software field. Examples of the computer-readable recording medium include magnetic media such as a hard disk, a floppy disk, and a magnetic tape, optical media such as a CD-ROM and a DVD, magneto-optical media such as a floptical disk, and a hardware device which is specifically configured to store and execute the program command such as a ROM, a RAM, and a flash memory. Examples of the program command include a high-level language code executable by a computer by using an interpreter, and the like, as well as a machine language code created by a compiler.

As described above, the present invention has been described by specified matters such as detailed components, and the like and limited exemplary embodiments and drawings, but the description is just provided to assist more overall understanding of the present invention and the present invention is not limited to the exemplary embodiment and various modifications and changes can be made by those skilled in the art from such a disclosure.

Accordingly, the spirit of the present invention should not be defined only by the described exemplary embodiments, and it should be appreciated that claims to be described below and all things which are equivalent to the claims or equivalently modified to the claims are included in the scope of the spirit of the present invention.

What is claimed is:

1. An electronic device for performing code-based encryption supporting integrity verification of a message, the electronic device comprising:
   a memory;
   a hardware processor;
   a public key storing unit, implemented using the hardware processor and/or the memory, storing a public key $K_{pub}$ ($K_{pub}$=SGP) in which a binary non-singular matrix S having a size of k×k (k is a natural number) including code values of "1" and "0" as components, and a generator matrix G having a size of k×n (n is the natural number) including code values of "1" and "0" as components with an error correction capability for t (t is the natural number) bit code, and a permutation matrix P including a size of n×n including the code values "1" and "0" as the components are multiplied by each other;
   a data generating unit, implemented using the hardware processor, splitting an original message m having a size of k bits to be transmitted to a data reception apparatus into a first partial message $m_1$ having a size of k–t (t is a natural number smaller than k) bits and a second partial message $m_2$ having a size of t bits and generating a random bit string r having a size of t bits;
   a hash value generating unit, implemented using the hardware processor, generating first concatenation data m∥r acquired by concatenating the original message m and the random bit string r and generating a hash value h by applying the first concatenation data m∥r to a predetermined hash function as an input;
   an error generating unit, implemented using the hardware processor, generating second concatenation data $m_2$∥h acquired by concatenating the second partial message $m_2$ and the hash value h and generating an error bit string e having a hamming weight of t and a size of n bits by applying the second concatenation data $m_2$∥h to a predetermined bit string generation function as an input, wherein when the input value is applied to the bit string generation function, the bit string generation function is a function outputting a bit string having a hamming weight of t and a size of n bits as an output value;
   a message encryption unit, implemented using the hardware processor, generating third concatenation data $m_1$∥r acquired by concatenating the first partial message $m_1$ and the random bit string r and generating an encryption message c by performing error correction based encryption based on the public key $K_{pub}$ and the error bit string e with respect to the third concatenation data $m_1$∥r; and
   a message encryption and transmission unit, implemented using the hardware processor, transmitting the encryption message c to the data reception apparatus for performing and/or determining the integrity verification of the transmitted encryption message c, wherein in response to determining that the integrity of the transmitted encryption message c is verified, the data reception apparatus restores the original message m by concatenating the first partial message $m_1$ and the second partial message $m_2$.

2. The electronic device of claim 1, wherein the message encryption unit generates a result value c' acquired by multiplying the third concatenation data $m_1$∥r by the public key $K_{pub}$ and performs an exclusive OR operation with respect to the result value c' and the error bit string e to generate the encryption message c.

3. The electronic device of claim 2, wherein the data reception apparatus
   stores the binary non-singular matrix S, the generator matrix G, and the permutation matrix P on the memory as a private key corresponding to the public key $K_{pub}$ and stores the hash function and the bit string generation function on the memory and when the encryption message c is received, the data reception apparatus performs error correction based decoding based on the binary non-singular matrix S, the generator matrix G, and the permutation matrix P stored on the memory as the private key to restore the third concatenation data $m_1$∥r from the encryption message c,
   when the third concatenation data $m_1$∥r is restored, restores the error bit string e based on the third concatenation data $m_1$∥r and the encryption message c and performs an inverse operation for deriving an input value having the error bit string e as an output value based on the bit string generation function stored on the memory to compute the second concatenation data $m_2 \| h$ and then extract the second partial message $m_2$ and the hash value h concatenated to the second concatenation data $m_2 \| h$, and when the second partial message $m_2$ and the hash value h are extracted, extracts the first partial message $m_1$ and the random bit string r concatenated to the third concatenation data $m_1 \| r$ and then generates the first concatenation data $m \| r$ by concatenating the first partial message $m_1$, the second partial message $m_2$, and the random bit string r and applies the first concatenation data $m \| r$ to the hash function stored on the memory as the input to generate a verification hash value h' and then determine that the integrity is verified with respect to the encryption message c when it is determined that the verification hash value h' is equal to the extracted hash value h.

4. The electronic device of claim 3, wherein when the data reception apparatus receives the encryption message c, the data reception apparatus computes $cP^{-1}$ by multiplying the encryption message c by an inverse matrix $P^{-1}$ of the permutation matrix P stored on the memory and performs the error correction decoding with respect to the $cP^{-1}$ based on the generator matrix G to compute $(m_1\|r)S$ obtained by multiplying the third concatenation data $m_1\|r$ and the binary non-singular matrix S and then multiplies the $(m_1\|r)S$ by an inverse matrix $S^{-1}$ of the binary non-singular matrix S to restore the third concatenation data $m_1\|r$.

5. An operating method of an electronic device, implemented using a hardware processor and a memory, for performing code-based encryption supporting integrity verification of a message, the operating method comprising:

maintaining, using the hardware processor and the memory, a public key storing unit storing a public key $K_{Pub}$ ($K_{Pub}$=SGP) in which a binary non-singular matrix S having a size of k×k (k is a natural number) including code values of "1" and "0" as components, and a generator matrix G having a size of k×n (n is the natural number) including code values of "1" and "0" as components with an error correction capability for t (t is the natural number) bit code, and a permutation matrix P including a size of n×n including the code values "1" and "0" as the components are multiplied by each other;

splitting an original message m having a size of k bits to be transmitted to a data reception apparatus into a first partial message $m_1$ having a size of k–t (t is a natural number smaller than k) bits and a second partial message $m_2$ having a size of t bits and generating a random bit string r having a size of t bits;

generating first concatenation data $m \| r$ acquired by concatenating the original message m and the random bit string r and generating a hash value h by applying the first concatenation data $m \| r$ to a predetermined hash function as an input;

generating second concatenation data $m_2 \| h$ acquired by concatenating the second partial message $m_2$ and the hash value h and generating an error bit string e having a hamming weight of t and a size of n bits by applying the second concatenation data $m_2 \| h$ to a predetermined bit string generation function as an input, wherein when the input value is applied to the bit string generation function, the bit string generation function is a function outputting a bit string having a hamming weight of t and a size of n bits as an output value;

generating third concatenation data $m_1 \| r$ acquired by concatenating the first partial message $m_1$ and the random bit string r and generating an encryption message c by performing error correction based encryption based on the public key $K_{pub}$ and the error bit string e with respect to the third concatenation data $m_1 \| r$; and transmitting the encryption message c to the data reception apparatus for performing and/or determining the integrity verification of the transmitted encryption message c, wherein when it is determined that the integrity of the transmitted encryption message c is verified, the data reception apparatus restores the original message m by concatenating the first partial message $m_1$ and the second partial message $m_2$.

6. The operating method of claim 5, wherein in the generating of the encryption message c, a result value c' is generated by multiplying the third concatenation data $m_1 \| r$ by the public key $K_{pub}$ and an exclusive OR operation is performed with respect to the result value c' and the error bit string e to generate the encryption message c.

7. The operating method of claim 6, wherein the data reception apparatus stores the binary non-singular matrix S, the generator matrix G, and the permutation matrix P on the memory as a private key corresponding to the public key $K_{pub}$ and stores the hash function and the bit string generation function on the memory and when the encryption message c is received, the data reception apparatus performs error correction based decoding based on the binary non-singular matrix S, the generator matrix G, and the permutation matrix P stored on the memory as the private key to restore the third concatenation data $m_1 \| r$ from the encryption message c, when the third concatenation data $m_1 \| r$ is restored, restores the error bit string e based on the third concatenation data $m_1 \| r$ and the encryption message c and performs an inverse operation for deriving an input value having the error bit string e as an output value based on the bit string generation function stored on the memory to compute the second concatenation data $m_2 \| h$ and then extract the second partial message $m_2$ and the hash value h concatenated to the second concatenation data $m_2 \| h$, and when the second partial message $m_2$ and the hash value h are extracted, extracts the first partial message $m_1$ and the random bit string r concatenated to the third concatenation data $m_1 \| r$ and then generates the first concatenation data $m \| r$ by concatenating the first partial message $m_1$, the second partial message $m_2$, and the random bit string r and applies the first concatenation data $m \| r$ to the hash function stored on the memory as the input to generate a verification hash value h' and then determine that the integrity is verified with respect to the encryption message c when it is determined that the verification hash value h' is equal to the extracted hash value h.

8. The operating method of claim 7, wherein when the data reception apparatus receives the encryption message c, the data reception apparatus computes $cP^{-1}$ by multiplying the encryption message c by an inverse matrix $P^{-1}$ of the permutation matrix P stored on the memory and performs the error correction decoding with respect to the $cP^{-1}$ based on the generator matrix G to compute $(m_1\|r)S$ obtained by multiplying the third concatenation data $m_1\|r$ and the binary non-singular matrix S and then multiplies the $(m_1\|r)S$ by an inverse matrix $S^{-1}$ of the binary non-singular matrix S to restore the third concatenation data $m_1\|r$.

9. A non-transitory computer readable recording medium having a program recorded therein for allowing a computer to execute an operating method of an electronic device for performing code-based encryption supporting integrity verification of a message, comprising:
  maintaining a public key storing unit storing a public key $K_{pub}$ ($K_{pub}$=SGP) in which a binary non-singular matrix S having a size of k×k (k is a natural number) including code values of "1" and "0" as components, and a generator matrix G having a size of k×n (n is the natural number) including code values of "1" and "0" as components with an error correction capability for t (t is the natural number) bit code, and a permutation matrix P including a size of n×n including the code values "1" and "0" as the components are multiplied by each other;
  splitting an original message m having a size of k bits to be transmitted to a data reception apparatus into a first partial message $m_1$ having a size of k−t (t is a natural number smaller than k) bits and a second partial message $m_2$ having a size of t bits and generating a random bit string r having a size of t bits;
  generating first concatenation data m∥r acquired by concatenating the original message m and the random bit string r and generating a hash value h by applying the first concatenation data m∥r to a predetermined hash function as an input;
  generating second concatenation data $m_2$∥h acquired by concatenating the second partial message $m_2$ and the hash value h and generating an error bit string e having a hamming weight of t and a size of n bits by applying the second concatenation data $m_2$∥h to a predetermined bit string generation function as an input, wherein when the input value is applied to the bit string generation function, the bit string generation function is a function outputting a bit string having a hamming weight of t and a size of n bits as an output value;
  generating third concatenation data $m_1$∥r acquired by concatenating the first partial message $m_1$ and the random bit string r and generating an encryption message c by performing error correction based encryption based on the public key $K_{pub}$ and the error bit string e with respect to the third concatenation data $m_1$∥r; and
  transmitting the encryption message c to the data reception apparatus, wherein the data reception apparatus performs and determines the integrity verification of the encryption message c transmitted from the electronic device, wherein when it is determined that the integrity of the transmitted encryption message c is verified, the data reception apparatus restores the original message m by concatenating the first partial message $m_1$ and the second partial message $m_2$.

* * * * *